Apr. 24, 1923.
G. E. GODDARD
DEMOUNTABLE WHEEL
Filed Sept. 3, 1919
1,452,597
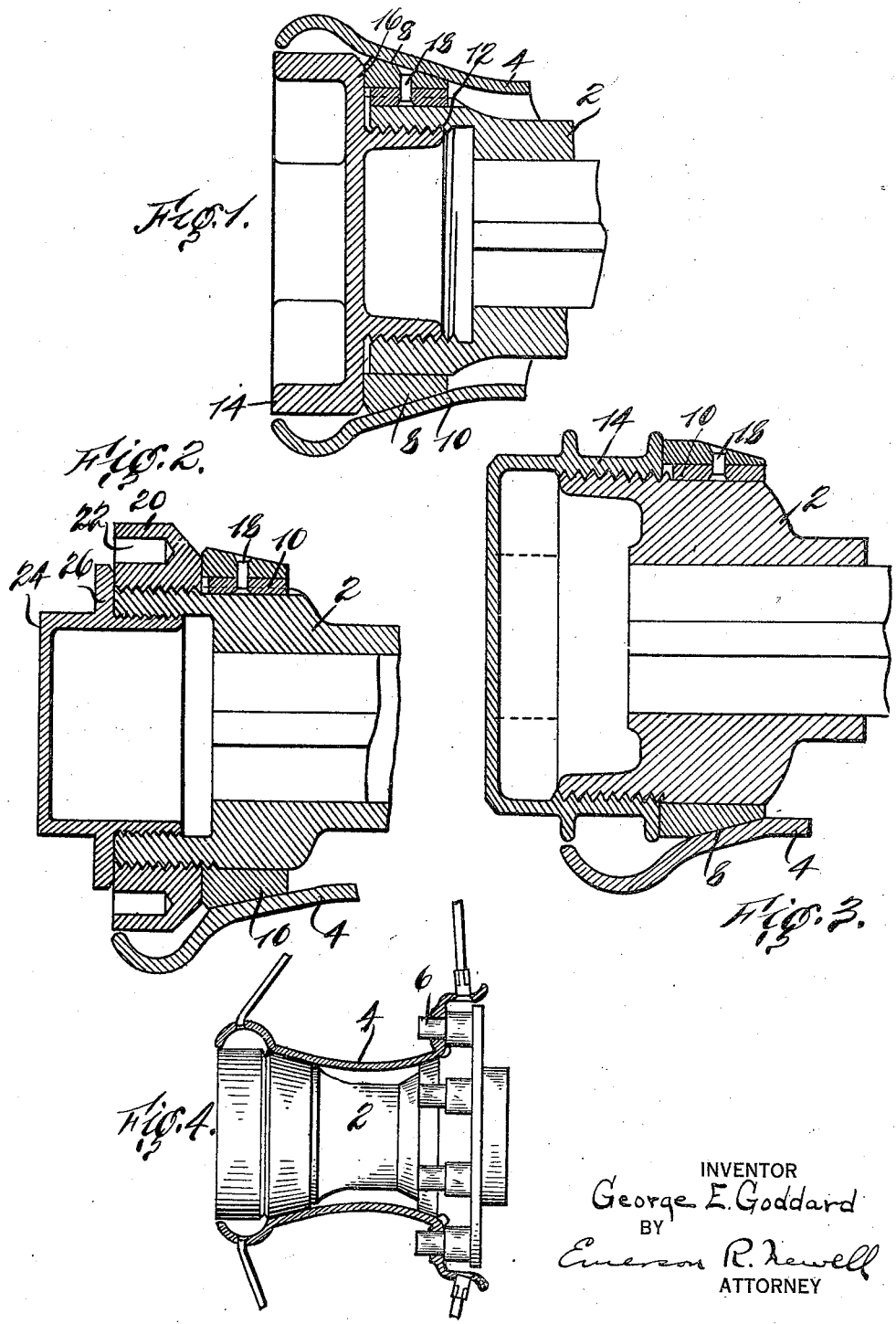
INVENTOR
George E. Goddard
BY
Emerson R. Newell
ATTORNEY Patented Apr. 24, 1923.

1,452,597

UNITED STATES PATENT OFFICE.

GEORGE E. GODDARD, OF DETROIT, MICHIGAN, ASSIGNOR TO DODGE BROTHERS, OF DETROIT, MICHIGAN, A CORPORATION OF MICHIGAN.

DEMOUNTABLE WHEEL.

Application filed September 3, 1919. Serial No. 321,336.

*To all whom it may concern:*

Be it known that I, GEORGE E. GODDARD, a citizen of the United States, residing at Detroit, Michigan, have invented certain new and useful Improvements in Demountable Wheels, of which the following is a clear, full, and exact description.

This invention relates to detachable wheels of the type in which an outer or detachable hub member is sleeved upon and engaged so as to revolve with an inner hub member, and the invention has for its object the provision of simple and reliable means for securing the two members for rotation together so that the danger of one hub becoming loose from the other is practically eliminated.

An important feature of the invention is the provision of locking means which is in contact with both the inner and outer hub members for holding them for rotation together, and a member which is screw-threaded into one of the hub members only, but out of contact with the other hub member, and when in home position bearing against the locking means. This locking means may be in the form of a locking ring tapered on its outer surface to engage a corresponding taper on the inner side of the outer hub member and having its inner surface formed to closely fit the inner hub member. To prevent any rotation of said locking ring, the same may be keyed to the inner hub member. The member screw threaded into one of the hub members may be in the form of a screw-threaded ring similar to the locking ring, or the usual hub cap may be modified to perform this office. In either case, this member is in threaded engagement with only one of the hub members and out of contact with the other.

Other features and advantages will be apparent from the following description and claims when taken in connection with the accompanying drawings, in which—

Fig. 1 represents a sectional view of the hub members and the locking means;

Fig. 2 is a similar view of a somewhat different construction;

Fig. 3 is a similar view of a still further modification, while Fig. 4 is an elevational view of the inner hub member of the construction shown in Fig. 1, the outer hub being shown in section.

Referring to the drawings, 2 indicates the inner hub member which is connected to the axle by suitable bearings. The outer hub member 4 is adapted to be connected for rotation with the inner hub member by means of studs 6 carried by the inner hub member, which studs engage perforations in a flange carried by the outer hub member so that the outer hub member and inner hub member are compelled to rotate together when the outer hub is slipped over the inner hub and secured in place.

In order to thus hold the outer hub in proper position with respect to the inner hub, said outer hub is of bell-mouthed shape and has a tapered portion 8 against which bears a lock ring 10. This lock ring is provided with a taper on its outer surface corresponding to the taper 8 so that if said ring is held in close engagement with the taper 8, the two hub members are held together for rotation.

In order to securely hold the ring 10 in place, the inner hub member is screw-threaded at 12, Fig. 1, and a nut cap is provided having similar screw threads. The bell mouthed portion of the outer hub member is so shaped, as shown in Fig. 1, that the tapered portion 8 bears against the tapered portion of the ring 10 but does not contact with the hub nut 14. When the hub nut, however, is screwed home, its inner surface contacts the surface of the lock ring at 16 and holds it securely in place.

It is well-known that if two solids of revolution, such as cylinders, cones, screw-threaded cylinders or the like, are put together one inside the other, the inner one is necessarily of shorter circumference than the outer one, and under conditions that keep the two parts in contact at one fixed point and substantially out of contact at a diametrically opposite point, if either of the two parts be rotated, there will be a tendency of the other part to rotate relatively to the first part, and the speed of relative rotation of the two parts will be inversely proportioned to the relative lengths of their circumferences, the inner part tending to rotate faster than the outer part. In applying this principle to hub constructions generally, the outer hub member 4 bearing at 8 against the inner locking ring 10 would have a tendency, when both parts are rotated, to cause the inner part, that is to say, the locking ring, to tend to move faster than the outer hub because the weight of the vehicle transmitted through the axle would tend to cause contact between the ring and outer hub at the lower portion of their adjacent circumferences, while at the opposite or top portion there would be a tendency for them to be out of contact. Hence, there would be a rolling tendency acting to cause the locking ring to rotate in the direction of rotation of the wheel. It has been proposed in prior constructions to utilize this principle to keep the locking ring or equivalent part held tightly against the outer hub member by having the locking rings screw-threaded and having these threads run in a direction such that the locking ring would tend to screw up during rotation of the wheel. This mode of operation is a basis of the patent to Pugh, No. 1,296,316 March 4, 1919.

In the present invention, however, I positively prevent the ring from rotating by keying the same to the inner hub member as shown at 18, in Figs. 1, 2 and 3.

In Fig. 2, the same principle of operation is utilized as set forth in describing the construction of Fig. 1. In this form, however, the screw threaded member which engages the locking ring is somewhat similar to the locking ring itself and consists of a member 20 screw-threaded to the outer portion of the inner hub member and bearing against the locking ring. In this form, as in the form illustrated in Fig. 1, the outer hub member does not touch or bear against the locking member 20. In order that said member may conveniently be screwed into place, spanner holes 22 are provided. A hub cap 24 is also provided in this form of construction which is also screw-threaded into the inner hub member, but the flange 26 of said cap need not bear against the member 20, as in this form of construction the hub cap performs no office except that of giving a finish to the hub.

The form of device shown in Fig. 3 is quite similar to that described in connection with Fig. 1, except that the hub nut is of slightly different form and fits threads provided on the outside of the inner hub member.

In this form, as in the form shown in Figs. 1 and 2, the outer hub member does not touch or bear against the hub nut but only against the locking ring 10.

What I claim is:

1. In a demountable wheel construction, the combination with an inner hub member, and an outer hub member mounted thereon, of locking means in contact with both of said members and holding them for rotation together, said locking means having positive connection with one of said hub members whereby it is held from rotation, and a member separate from said locking means and screw threaded to said inner hub member and out of contact with said outer hub member and when screwed home bearing against said locking means to hold the same in place.

2. In a demountable wheel construction, the combination with an inner hub member and an outer hub member non-rotatably mounted thereon, of means for holding said outer hub member against longitudinal displacement, said means comprising a ring in sliding engagement with said hub members and keyed to one of them, and a part screw-threaded to one hub member but out of contact with the other hub member and adapted to bear against said ring.

3. In a demountable wheel construction, the combination with an inner hub member, and an outer hub member mounted thereon, of locking means having a tapered surface engaging one of said hub members and a surface engaging the other hub member, means for positively holding said locking means to one of said hub members, and means for holding said locking means in place.

4. In a demountable wheel construction, the combination with an inner hub member, and an outer hub member mounted thereon, of locking means having a tapered surface engaging one of said hub members and a surface engaging the other hub member, said locking means being keyed to one of said hub members and means screw threaded into one of said hub members for holding said locking means in place.

5. In a demountable wheel construction, the combination with an inner hub member and an outer hub member mounted thereon, of a locking ring for holding said hub members for rotation together, said ring comprising a two part piece, one of said parts engaging between said hub members, the other part screw threaded into one of said hub members but out of contact with the other hub member, and engaging, when in home position, said first mentioned part, and a hub cap engaging one of said hub members, there being clearance between said cap and one part of said locking piece when said hub cap is in home position.

6. In a demountable wheel construction, the combination with an inner hub member and an outer hub member mounted thereon, of a locking ring for holding said hub members for rotation together, said locking ring comprising a two part piece, one of said parts keyed to said inner hub member and having a surface engaging said outer hub member, said other part screw threaded into said inner hub member but out of contact with said outer hub member and engaging, when in home position, said first mentioned part, and a hub cap also screw threaded into said inner hub member but out of contact with the screw threaded part of said locking ring when the hub cap is in home position.

Signed at Detroit, Mich., this 25th day of August, 1919.

GEORGE E. GODDARD.

Witnesses:
ALFRED H. KNIGHT,
JOHN R. FURSE.